(12) United States Patent
Nakamura et al.

(10) Patent No.: US 6,182,771 B1
(45) Date of Patent: Feb. 6, 2001

(54) TRACTOR

(75) Inventors: Kentaro Nakamura, Wakayama; Akio Hattori, Osaka, both of (JP)

(73) Assignee: Kubota Corporation (JP)

(*) Notice: Under 35 U.S.C. 154(b), the term of this patent shall be extended for 0 days.

(21) Appl. No.: 09/351,583

(22) Filed: Jul. 12, 1999

(30) Foreign Application Priority Data

Sep. 25, 1998 (JP) .................................................. 10-270981

(51) Int. Cl.$^7$ .................................................. A01B 33/08
(52) U.S. Cl. ........................... 172/431; 172/776; 296/196
(58) Field of Search ..................................... 172/317, 431, 172/776, 439; 180/242, 247, 243, 311, 312; 296/24.1, 185, 186, 190.01, 190.08, 190.11, 191, 196, 37.14, 37.15, 37.16

(56) References Cited

U.S. PATENT DOCUMENTS 3,922,932 * 12/1975 Sugiyama et al. ................... 172/465
4,315,548 * 2/1982 Nakamura et al. .................. 172/430
4,570,425 * 2/1986 Carr ......................................... 56/7
5,823,285 * 10/1998 Tsuchihashi et al. ............... 180/242
6,053,257 * 4/2000 Sugiyama et al. .................... 172/465

FOREIGN PATENT DOCUMENTS 60-22103    2/1985  (JP) .

* cited by examiner

*Primary Examiner*—Victor Batson
(74) *Attorney, Agent, or Firm*—Webb Ziesenheim Logsdon Orkin & Hanson, P.C.

(57) ABSTRACT

A tractor has hydraulic cylinders arranged reawardly of a transmission case for swinging lift arms. A plurality of control valves for controlling the hydraulic cylinders are arranged on a lid plate of the transmission case. Oil lines are disposed in the lid plate for intercommunicating the control valves.

16 Claims, 9 Drawing Sheets

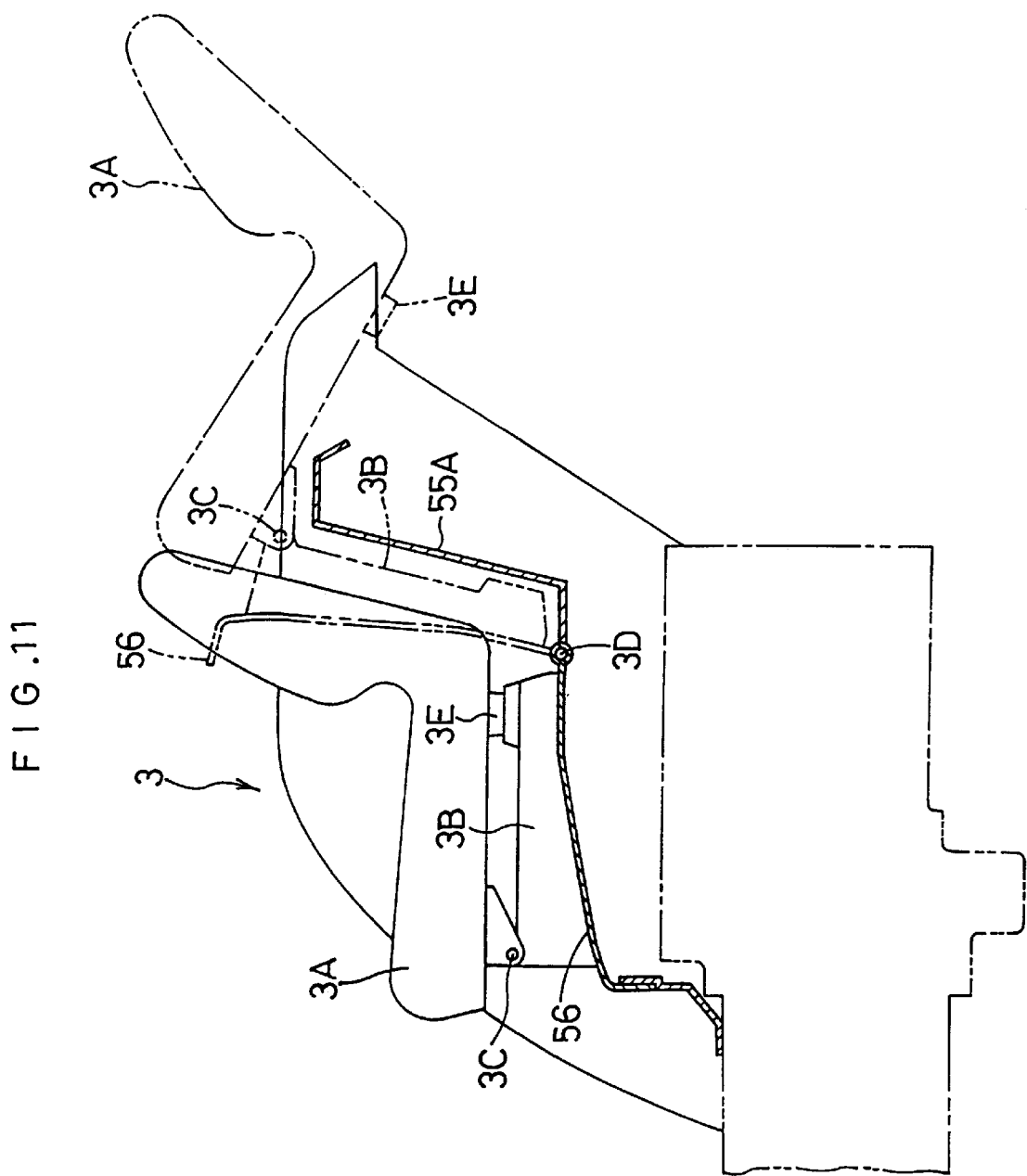

TRACTOR

BACKGROUND OF THE INVENTION

1. Field of the Invention

This invention relates to a tractor with a ground-working implement such as a rotary plow drivably and vertically movably coupled thereto.

2. Description of the Related Art

A conventional tractor of the type noted above is disclosed in Japanese Utility Model Publication Kokai No. 60-22103, for example. According to this publication, control valves for controlling hydraulic cylinders are mounted on the upper surface of a lid plate closing an opening formed in the upper surface of a transmission case.

In such a case, a plurality of control valves are arranged on the upper surface of the lid plate of the transmission case. The conventional construction noted above requires hydraulic piping to provide communication among the control valves. Otherwise, the control valves must be directly interconnected to communicate with one another.

Thus, where the control valves are interconnected through hydraulic piping, the conventional construction noted above requires an operation to install the control valves on the lid plate, and an operation to connect the hydraulic piping to the control valves. Where the control valves are interconnected directly, the conventional construction requires an operation to connect the control valves to one another, besides the operation to install the control valves on the lid plate. All these operations render a poor work efficiency of assembling the control valves.

Moreover, when removing one control valve from the lid plate to carry out maintenance, a troublesome operation is required, such as disassembling the hydraulic piping, or disconnecting the control valve from the other control valves. The conventional construction also lacks in facility of maintenance.

SUMMARY OF THE INVENTION

The object of this invention is to improve the efficiency of assembly and maintenance.

A tractor according to this invention comprises lift arms vertically pivotable relative to a transmission case disposed in a rear position of a vehicle body, about an axis extending transversely of the vehicle body, a lid plate for closing an upper opening formed in the transmission case, and a plurality of control valves arranged on an upper surface of the lid plate for controlling hydraulic cylinders that swing the lift arms, the lid plate defining oil lines for intercommunicating the control valves.

In the above construction, the lid plate supporting the control valves defines oil lines for intercommunicating the control valves. Thus, only by placing the control valves in predetermined positions of the lid plate, installation of the control valves and connection among the control valves are completed. As a result, assembly and maintenance of the control valves are carried out with excellent work efficiency.

In an embodiment of this invention, hydraulic cylinders for swinging the lift arms, preferably, are arranged rearwardly and outwardly of the transmission case. This construction has an advantage, for example, over the case of incorporating the hydraulic cylinders in upper positions of the transmission case, of allowing a seat to be mounted at a reduced height above the transmission case.

In the embodiment of this invention, the control valves for controlling the hydraulic cylinders, preferably, are disposed forwardly of a control valve for controlling a different hydraulic device. With this construction, a distance is secured between the hydraulic cylinders and the control valves for controlling the hydraulic cylinders, by arranging the control valves for controlling the hydraulic cylinders forwardly of the control valve for controlling the different hydraulic device. Compared with the case of arranging the control valves in the opposite fore and aft relationship, hydraulic hoses having increased lengths may be used to connect the hydraulic cylinders to the control valves for controlling the hydraulic cylinders. Consequently, the hydraulic hoses may be handled with ease, and connection between the hydraulic cylinders and the control valves for controlling the hydraulic cylinders may be performed with excellent work efficiency.

Preferably, a seat supporting floor sheet is disposed above the transmission case, which sheet defines a maintenance opening in a position thereof opposed to an area of installation of the control valves for controlling the hydraulic cylinders and the control valve for controlling the different hydraulic device, the maintenance opening being closed by a detachable lid. This construction allows an operation to maintain the control valves to be carried out through the maintenance opening. This maintenance operation is possible although an area over the control valves is covered by the floor sheet.

In the embodiment of this invention, the control valves for controlling the hydraulic cylinders and the control valve for controlling the different hydraulic device, preferably, are secured to the lid plate by tightening bolts from above. This construction facilitates maintenance, including detachment and attachment, of the control valves performed through the opening formed in the floor sheet.

Where a seat is mounted on the lid of the floor sheet, the seat may be removed along with the lid. Thus, the seat does not obstruct an operation to maintain the control valves carried out with the lid removed to expose the opening.

In the embodiment of this invention, the maintenance opening is formed to envelope the area of control valve installation in plan view. This construction allows tools and the like easy access to the control valves through the opening, thereby to facilitate maintenance, including detachment and attachment, of the control valves.

The tractor may further comprise a bracket for pivotably supporting the lift arms, the bracket being attached along with the lid plate to a main body of the transmission case by common bolts. This construction allows the bracket and lid plate to be attached with excellent work efficiency, and realizes a mounting structure serving a plurality of purposes.

In the embodiment of this invention, the bracket for pivotably supporting the lift arms is formed integral with the lid plate. In this way, the two components may be integrated into a single unit.

This integrating feature not only realizes a simplified construction but improves assembling efficiency.

BRIEF DESCRIPTION OF THE DRAWINGS

FIG. 11 is an explanatory view showing modified lid and seat structures.

DETAILED DESCRIPTION OF THE PREFERRED EMBODIMENT

In the following description and claims, the terms fore and aft direction, right and left direction, and transverse direction are used with reference to a tractor.

Figure 1:
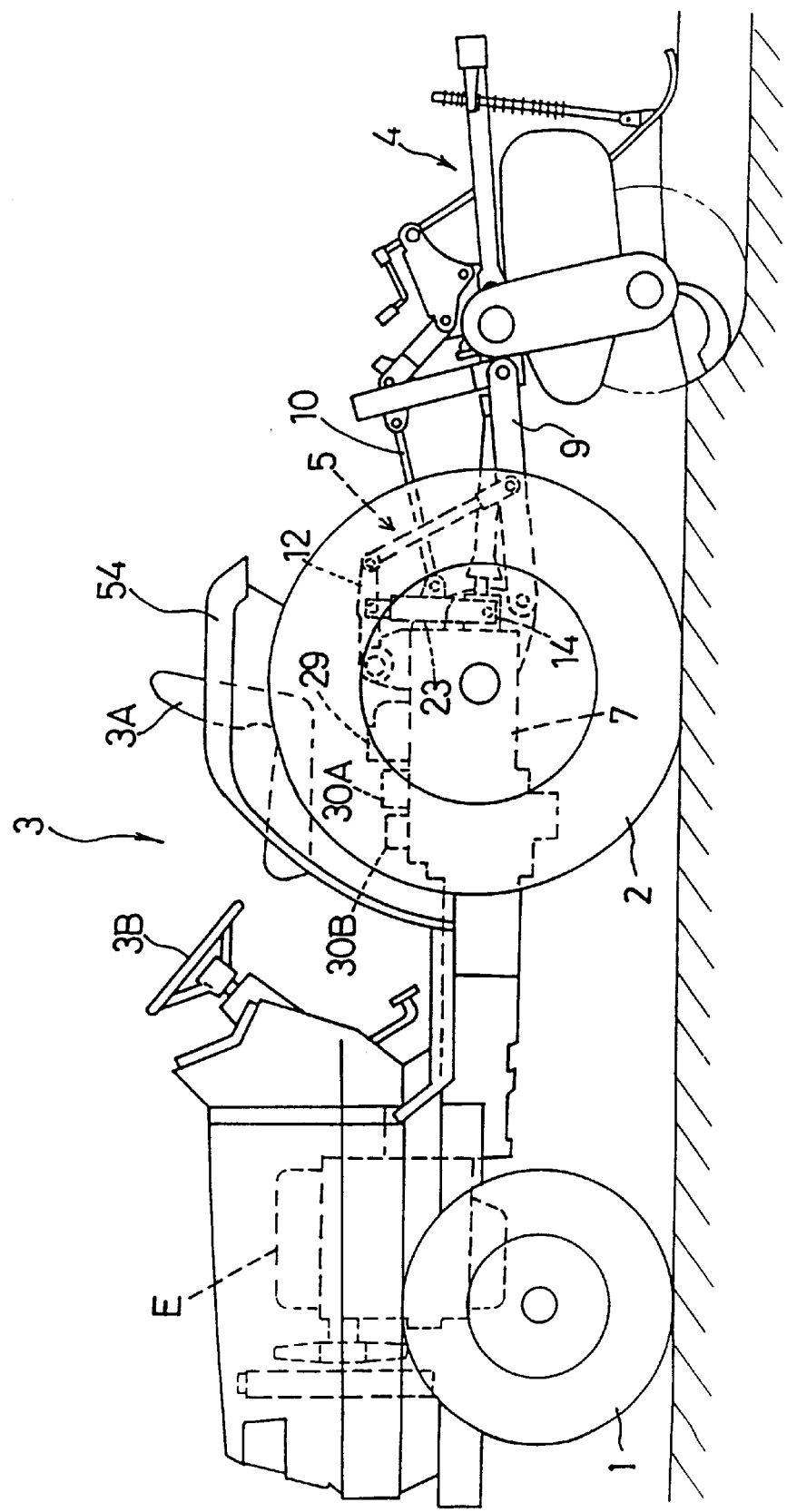
FIG. 1 is a side elevation of a tractor constructed in accordance with this invention.
Figure 2:
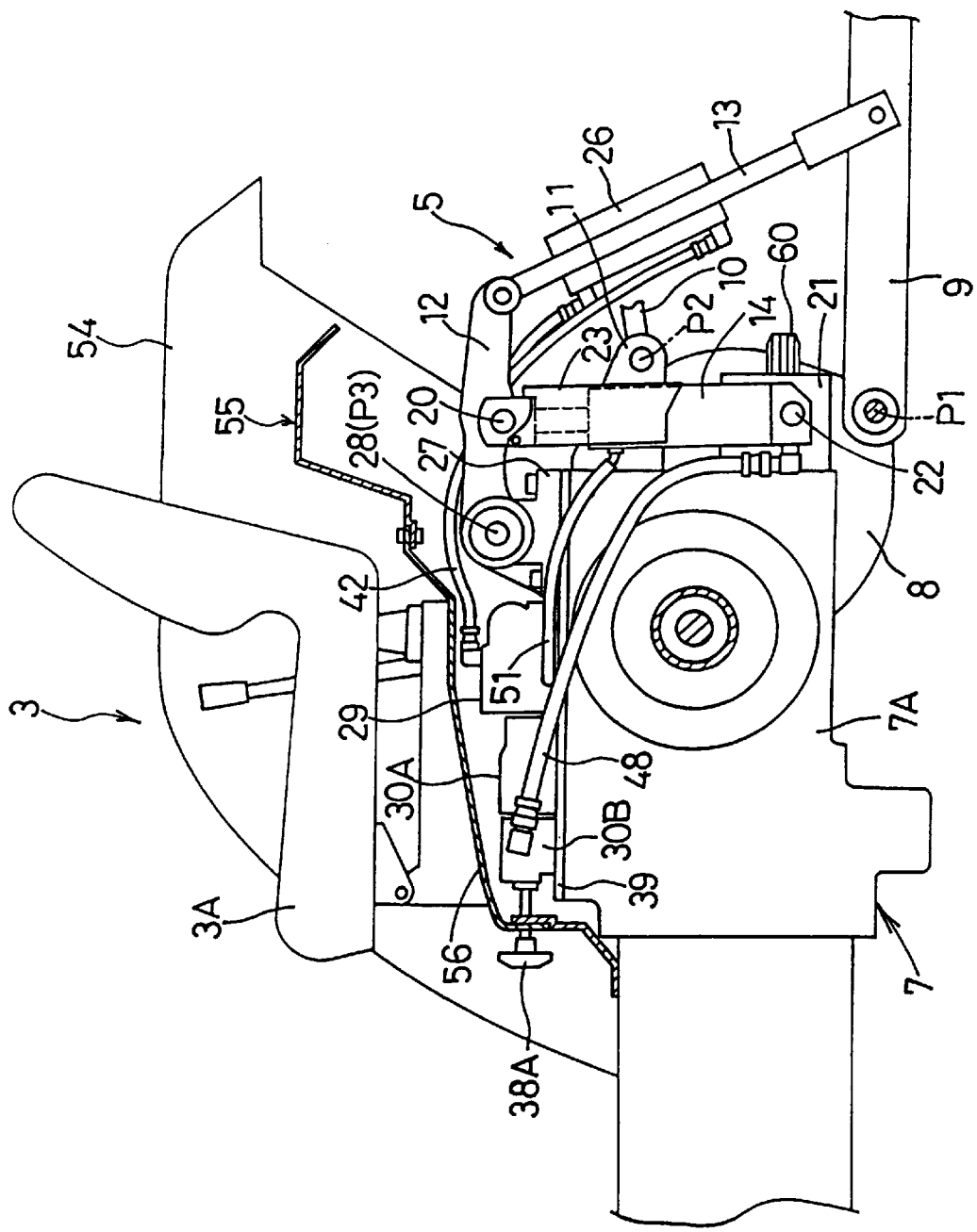
FIG. 2 is a sectional side view of a rear portion of the tractor.
Figure 8:
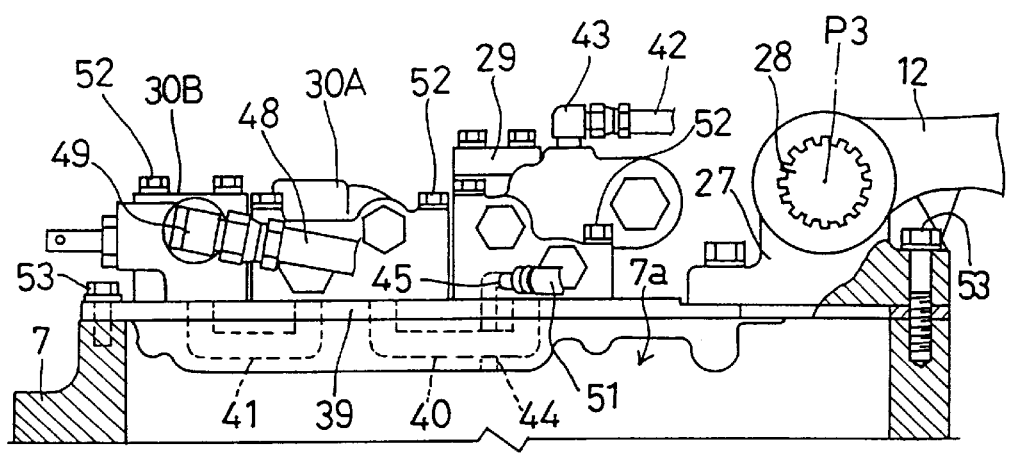
FIG. 8 is a sectional side view showing a valve arrangement.

As shown in FIG. 1, the tractor includes a vehicle body having a pair of right and left dirigible front wheels 1 and a pair of right and left rear drive wheels 2. An engine E and a driving platform 3 are arranged in the fore and aft direction on the vehicle body. The tractor further includes a three-point link mechanism 5 attached to the rear of the vehicle body for coupling a ground-working implement 4 such as a rotary plow to be vertically movable and rollable relative to the vehicle body. The ground-working implement 4 is vertically movable by a lifting device, and rollable by a rolling device. The front wheels 1 are attached to the vehicle body through a front axle case. As shown in FIG. 2, the rear wheels 2 are attached to the vehicle body through a transmission case 7 forming a rear portion of the vehicle body. As shown in FIGS. 2 and 8, the transmission case 7 includes a main case body 7A having an upper opening, a lid plate 39 for closing the upper opening, and a power takeout shaft 60 projecting rearward.

The three-point link mechanism 5 includes a pair of right and left lower links 9 for vertically pivotably coupling the ground-working implement 4, and a top link 10 for regulating a fore and aft posture of vertically pivotable ground-working implement 4. As shown in FIG. 2, the lower links 9 are connected to a rear axle case 8 to be vertically pivotable about a first transverse axis P1. The top link 10 is connected to a first bracket 11 connected to the rear of transmission case 7, to be vertically pivotable about a second transverse axis P2.

The lifting device will be described next. As shown in detail in FIGS. 2 and 4, a support shaft 28 is mounted, to be rotatable about a third transverse axis P3, in a lift bracket 27 formed integral with an upper surface of transmission case 7. A pair of right and left lift arms 12 are attached to opposite ends of the support shaft 28 through splines to be vertically pivotable with rotation of the support shaft 28. A pair of right and left lift rods 13 interconnect the corresponding lift arms 12 and lower links 9 so that the lower links 9 vertically pivot with vertical pivotal movement of the lift arms 12. A pair of right and left hydraulic cylinders 14 are provided for vertically swinging the lift arms 12, respectively. Thus, the lifting device includes the lift bracket 27, support shaft 28, lift arms 12, lift rods 13 and hydraulic cylinders 14.

As shown in detail in FIGS. 5(A) and (B), each hydraulic cylinder 14 is a single-acting cylinder including a cylinder tube 15 having a piston 16 mounted therein and defining an oil chamber 17 at one side of piston 16. An air chamber 18 is formed at the other side of piston 16. A piston rod 19 has a forward end thereof pivotally connected to one of the lift arms 12 through a pivot 20. The lower end of cylinder tube 15 is pivotally connected, through a pivot 22, to a second bracket 21 connected to the transmission case 7. The hydraulic cylinders 14 are arranged outwardly of the rear of transmission case 7. That is, in plan view, the hydraulic cylinders 14 are arranged rearwardly of the transmission case 7 without overlapping the transmission case 7.

Each hydraulic cylinder 14 is extended by pressure oil supplied thereto, to swing the lift arm 12 upward against a load. Each hydraulic cylinder 14 is contracted when the pressure oil is drained therefrom, to allow the lift arm 12 to pivot downward under the load. A grease nipple 15A is attached to the lower end of cylinder tube 15 for injecting grease to lubricate between a pivot bore 15a and pivot 22. The piston rod 19 is pressed and moved by the piston 16 when the pressure oil is supplied. That is, the piston rod 19 is in contact with the piston 16, and is movable on its own in a direction of extension.

Figure 5:
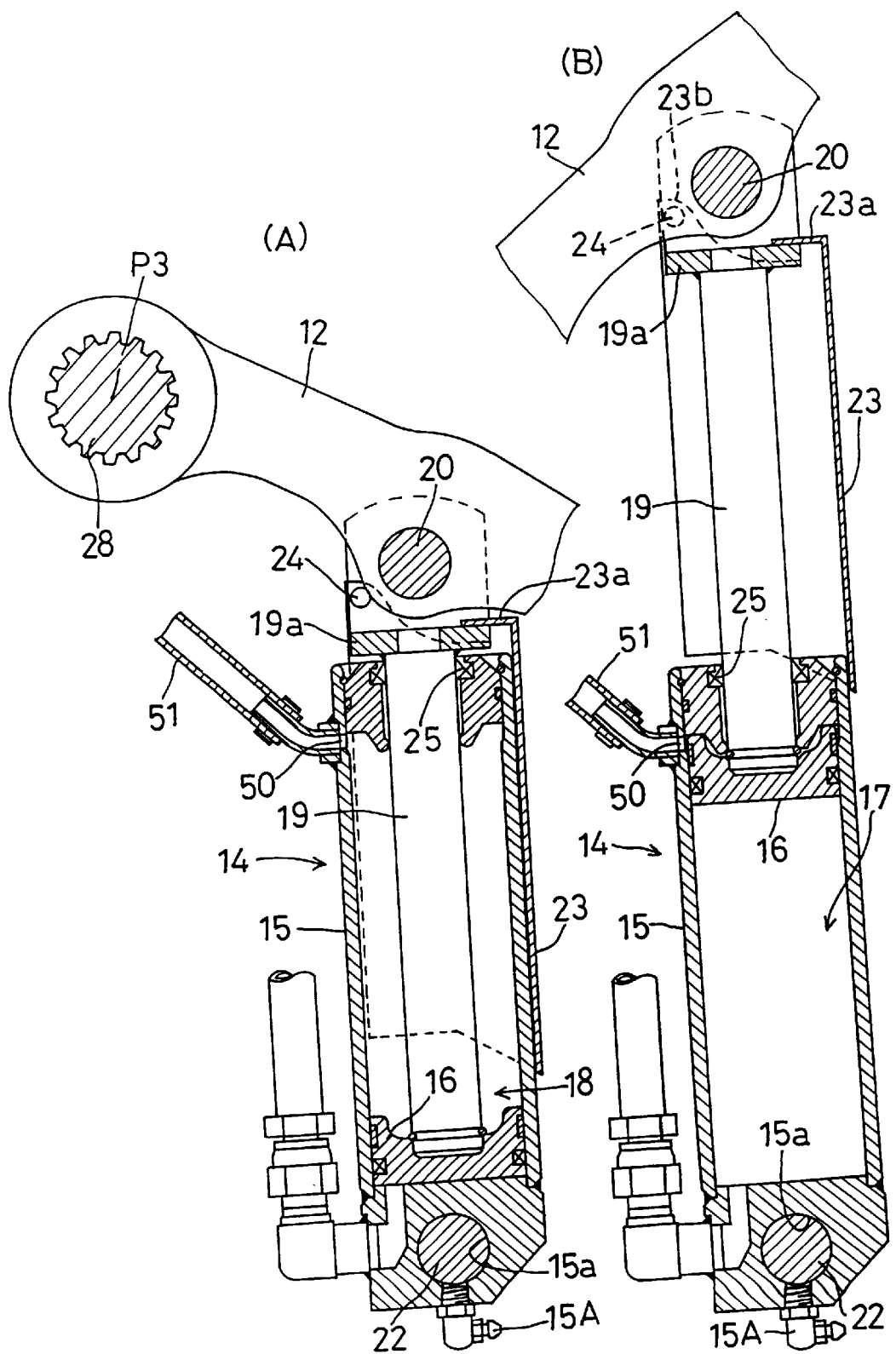
FIGS. 5(A) and 5(B) are sectional side views showing extension and contraction of a hydraulic cylinder.
Figure 6:
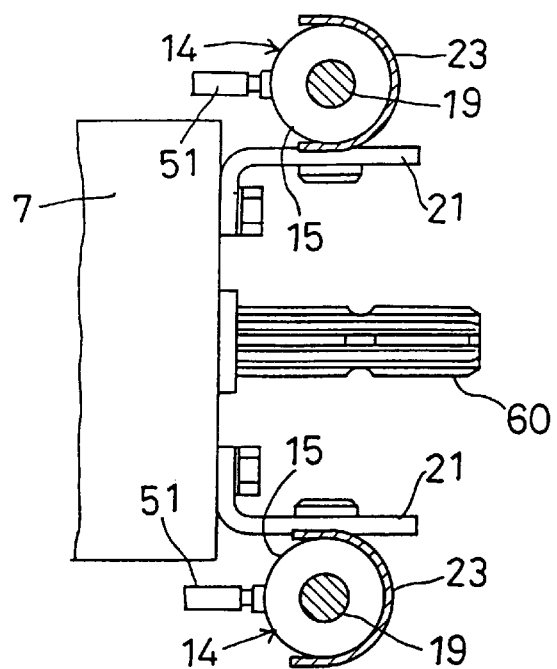
FIG. 6 is a cross section of a cylinder cover.
Figure 7:
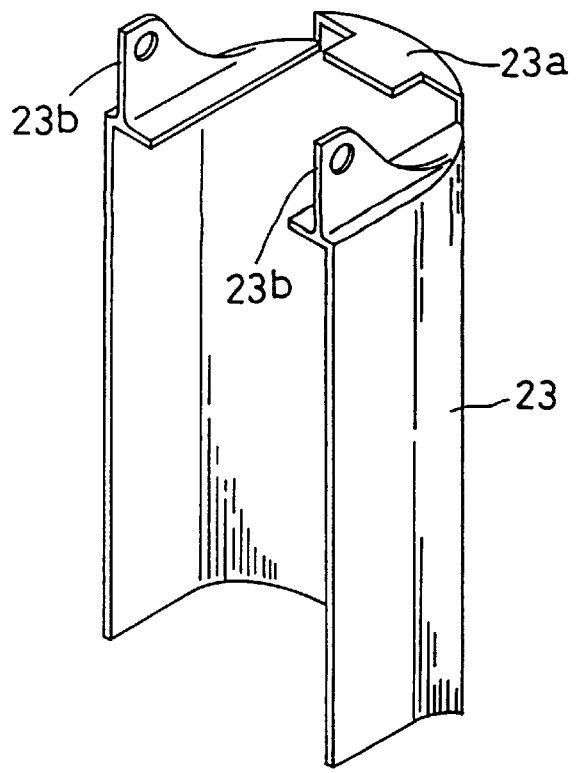
FIG. 7 is a perspective view of the cylinder cover.

As shown in FIG. 2, and as shown in detail in FIGS. 5 and 6, when the hydraulic cylinder 14 is extended, the piston rod 19 is surrounded by a cylinder cover 23 movable with the piston rod 19 relative to the cylinder tube 15. As shown also in FIG. 7, the cylinder cover 23 has a U-shaped section opening forward and covering the right and left sides and the rear of piston rod 19. The cylinder cover 23 is attached to the piston rod 19, with a top piece 23a thereof engaging a top bracket 19a of piston rod 19, and top upstanding pieces 23b fixed to the top bracket 19a by bolts 24.

A dust seal 25 is mounted between the cylinder tube 15 and piston rod 19.

Figure 3:
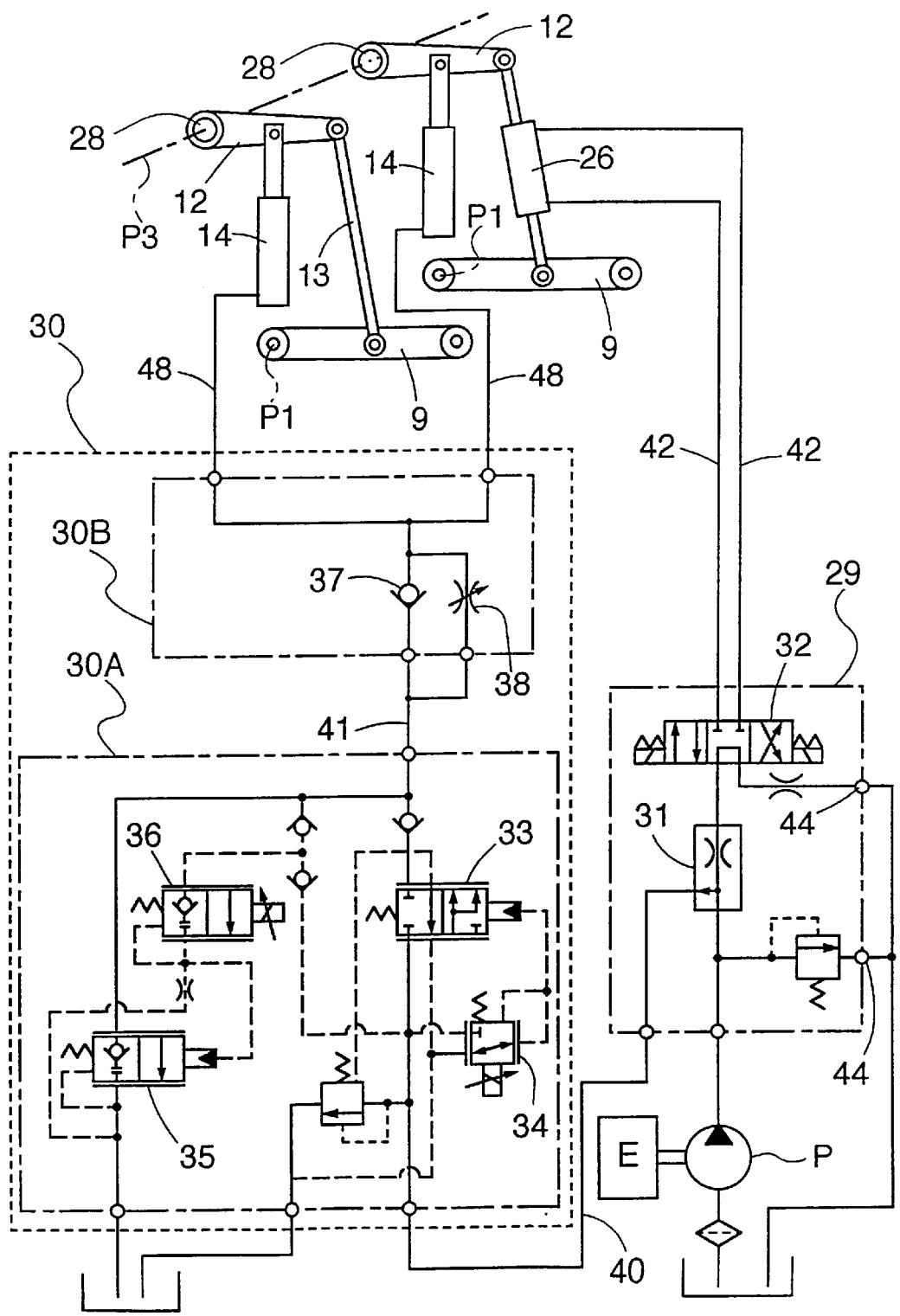
FIG. 3 is a hydraulic circuit diagram.

As shown in FIGS. 2 and 3, the rolling device includes an extendible, contractible and fixable double-acting hydraulic cylinder 26 provided for one of the lift rods 13. The hydraulic cylinder 26 is extended or contracted to swing one of the lower links 9 relative to the other, thereby rolling the ground-working implement 4. That is, the hydraulic cylinder 26 is one example of different hydraulic devices.

FIG. 3 shows a hydraulic circuit for controlling the hydraulic cylinders 14 and 26. The hydraulic circuit includes a rolling control valve 29 for controlling the rolling hydraulic cylinder 26, and a lift control valve 30 for controlling the lifting hydraulic cylinders 14.

The rolling control valve 29 includes a flow priority valve 31 for dividing pressure oil from a hydraulic pump P driven by the engine E, into a control flow and a surplus flow. The control valve 29 further includes an electromagnetic rolling valve 32 switchable among a contracting position for contracting the hydraulic cylinder 26 by supplying the control flow thereto, an extending position for extending the hydraulic cylinder 26 by supplying the control flow thereto, and a neutral position for locking the hydraulic cylinder 26 by stopping the supply of the control flow thereto.

The lift control valve 30 is divided into a lift control valve portion 30A and a fall velocity (lowering speed) adjusting valve portion 30B.

The lift control valve portion 30A includes a raising valve 33 for supplying the surplus flow from the flow priority valve 31 to the hydraulic cylinders 14, an electromagnetic raising pilot valve 34 for operating the raising valve 33 with a pilot pressure, a lowering valve 35 for draining pressure oil from the hydraulic cylinders 14 into the transmission case 7, and an electromagnetic lowering pilot valve 36 for operating the lowering valve 35 with a pilot pressure. Each of the raising pilot valve 34 and lowering pilot valve 36 varies the pilot pressure with a degree of opening thereof variable in proportion to an electric current supplied to an electromagnetic solenoid. Thus, the degrees of opening of the raising valve 33 and lowering valve 35 are adjusted by variations in the pilot pressure.

The lowering speed adjusting valve portion 30B includes a check valve 37 for supplying only the pressure oil from the raising valve 33 to the hydraulic cylinders 14, and a fully closable, variable throttle valve 38 for adjusting the lowering speed by applying a resistance corresponding to a control amount of a control device 38A, to the pressure oil drained from the hydraulic cylinders 14.

Figure 4:
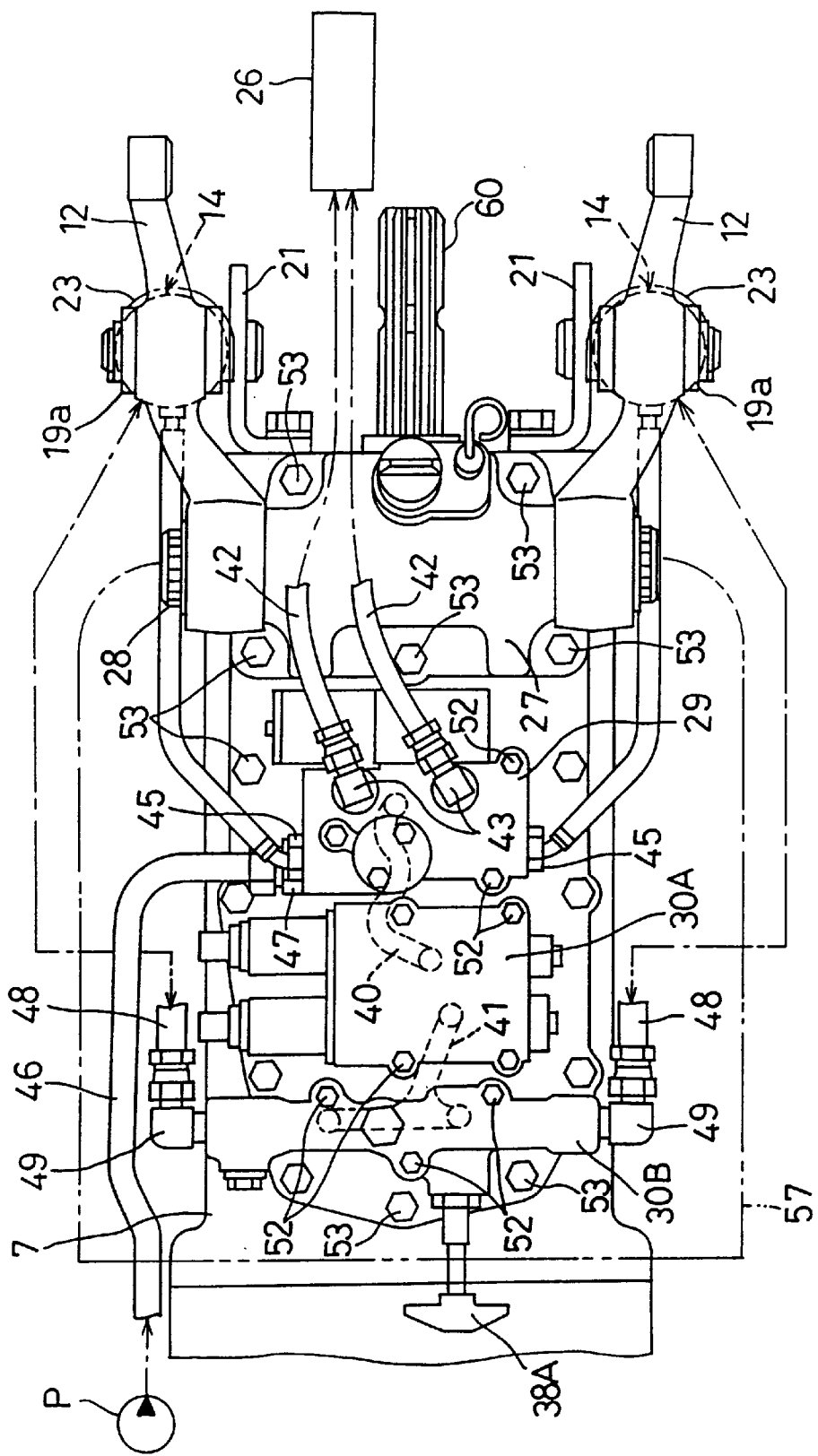
FIG. 4 is a plan view of the rear portion of the tractor.

As shown in detail in FIGS. 2, 4 and 8, the rolling control valve 29, lift control valve portion 30A and lowering speed adjusting valve portion 30B are mounted on the upper surface of lid plate 39 closing the upper opening 7a formed in the transmission case 7. The lowering speed adjusting valve portion 30B is disposed in a foremost position, the lift control valve portion 30A disposed next, and the rolling control valve 29 disposed rearwardly thereof. The lid plate 39 has, formed therein, an oil line 40 extending from the rolling control valve 29 to the lift control valve portion 30A, and an oil line 41 extending from the lift control valve portion 30A to the lowering speed adjusting valve portion 30B. These oil lines 40 and 41, preferably, are arranged below the upper surface of lid plate 39, and within the vertical thickness of lid plate 39. These oil lines 40 and 41 may be in the form of pipes arranged below the upper surface of lid plate 39, and exposed from the lower surface of lid plate 39. The rolling control valve 29 has, projecting therefrom, a pair of rolling connectors 43 for connecting a pair of hydraulic hoses 42 extending to the rolling hydraulic cylinder 26, a pair of drain connectors 45 for communicating with a pair of drain ports 44 to the transmission case 7, and a pump connector 47 for connecting a hydraulic pipe 46 extending from the hydraulic pump P. The lowering speed adjusting valve portion 30B has, projecting therefrom, a pair of lift connectors 49 for connecting a pair of hydraulic hoses 48 extending to the lifting hydraulic cylinders 14.

As shown in FIG. 5, each of the drain connectors 45 communicates, through a vent tube 51, with a corresponding one of air vents 50 formed in the air chambers 18 of lifting hydraulic cylinders 14. That is, each air chamber 18 communicates with an interior of transmission case 7 through the air vent 50, tube 51, drain connector 45 and drain port 44.

As shown in FIGS. 4 and 8, the rolling control valve 29, lift control valve portion 30A and lowering speed adjusting valve portion 30B are secured to the upper surface of lid plate 39 by a device including bolts 52 tightened from above. The lid plate 39 is secured to the main case body 7A by bolts 53 tightened from above. The lift bracket 27 is placed on the lid plate 39, and fastened to the lid plate 39 and main case body 7A by the bolts 53.

Figure 9:
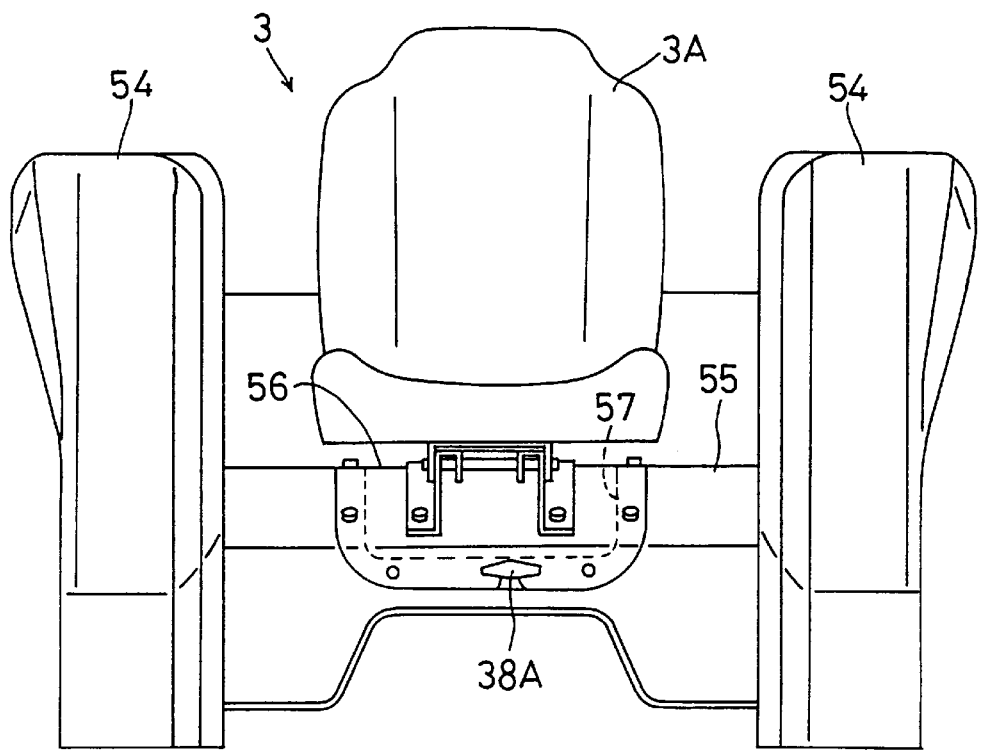
FIG. 9 is a front view of a seat supporting structure.

The driving platform 3 includes a seat 3A and a steering wheel 3B arranged between right and left rear wheel fenders 54. As shown in FIGS. 2 and 9, the seat 3A is mounted on a seat supporting floor sheet 55 formed integral with the rear wheel fenders 54 and disposed above the transmission case 7.

As shown also in FIG. 4, a maintenance opening 57 is formed in a position of floor sheet 55 opposed to the control valves 29 and 30. The opening 57 is closed by a lid 56 detachably attached by bolts. In plan view, the opening 57 is formed to envelope the area where the valves are installed.

The seat 3A is mounted on the lid 56 forming part of the floor sheet 55.

Other Embodiments

Figure 10:
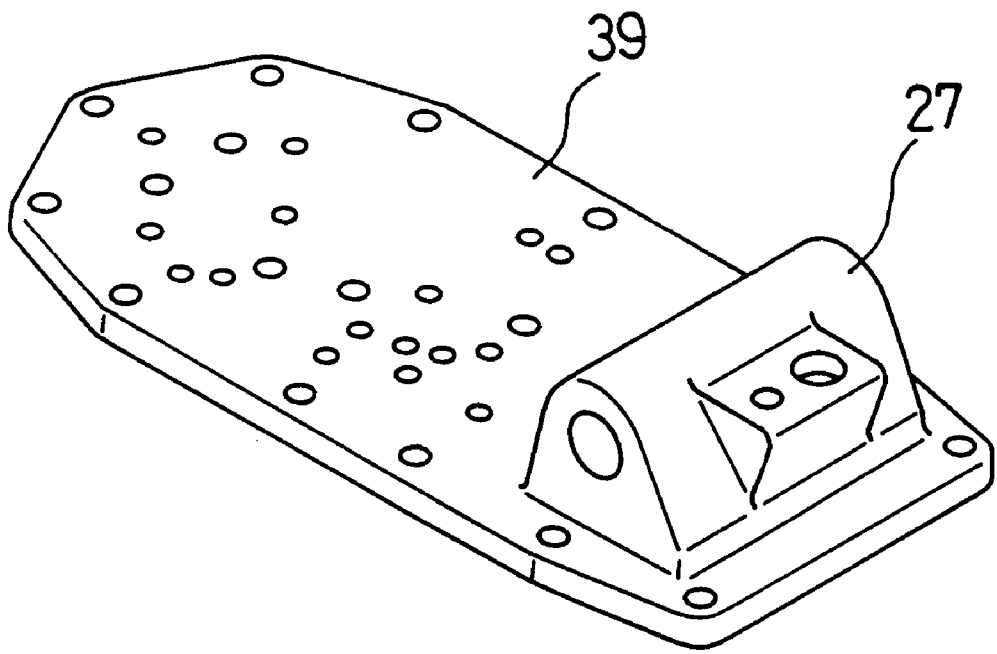
FIG. 10 is a perspective view of a modified lid plate/bracket unit.

As shown in FIG. 10, the lift bracket 27 and lid plate 39 may be integrated into a cast article.

In the foregoing embodiment, the rolling hydraulic cylinder 26 is described as the different hydraulic device. The different hydraulic device 26 may be a hydraulic cylinder for swinging the lower links 9 right and left, that is shifting the ground-working implement 4 right and left.

The control valves 29 and 30 may be arranged transversely.

As shown in FIG. 11, the lid 56 may be adapted vertically pivotable about a transverse axis 3D relative to the remaining portion of floor sheet 55. A seat support 3B is fixed to the lid 56. The seat 3A is supported by the seat support 3B to be pivotable relative thereto about a support axis 3C extending transversely. Rubber cushions 3E are attached to lower positions of the seat 3A for contacting the seat support 3B. Preferably, the floor sheet 55 has a rear portion thereof extending upward to define a support wall 55A.

Where this construction is employed, it is preferred that, to facilitate its opening, the lid 56 is fixed to the floor sheet 55 not by bolts but by a conventional structure including a handle, not shown, which is turned to lock the lid 56.

Thus, while swinging open the lid 56 about the axis 3D, the seat 3A may also be swung about the support axis 3C until the seat support 3B contacts the support wall 55A. As a result, the lid 56 and seat 3A are moved to a position described in broken lines in FIG. 11. This position allows the control valves 29 and 30 to be accessed for a maintenance operation or the like.

In this case, the lid 56 may be formed to have a fore and aft length corresponding approximately to the length of support wall 55A. Consequently, a lower portion of seat 3A may contact and rest on the support wall 55A.

In this embodiment, instead of fixing the seat support 3B to the lid 56, the seat support 3B and lid 56 may be attached independently of each other to the floor sheet 55 to be pivotable about two separate pivotal axes extending transversely. Only the seat support 3B may be pivotably attached to the floor sheet 55, with the lid 56 attached by bolts or a latch.

What is claimed is:

1. A tractor comprising:
   a transmission case disposed in a rear position of a vehicle body;
   a lid plate for closing an upper opening formed in said transmission case;
   lift arms vertically pivotable relative to said transmission case about an axis extending transversely of said vehicle body;
   hydraulic cylinders operatively connected to said lift arms to pivot said lift arms;
   a plurality of control valves arranged on an upper surface of said lid plate for controlling said hydraulic cylinders; and
   oil lines for said control valves, said oil lines being disposed in said lid plate.

2. A tractor as defined in claim 1, wherein said oil lines are formed within a vertical thickness of said lid plate.

3. A tractor as defined in claim 1, wherein said hydraulic cylinders are arranged rearwardly of said transmission case in plan view.

4. A tractor as defined in claim 1, further comprising a control valve for controlling a hydraulic device different from said hydraulic cylinders, said control valve being arranged along with said control valves for controlling said hydraulic cylinders.

5. A tractor as defined in claim 4, wherein said control valves for controlling said hydraulic cylinders are disposed forwardly of said control valve for controlling said different hydraulic device.

6. A tractor as defined in claim 4, further comprising a seat supporting floor sheet disposed above said transmission case and defining a maintenance opening in a position opposed to an area of installation of said control valves for controlling said hydraulic cylinders and said control valve for controlling said different hydraulic device, said maintenance opening being closed by a detachable lid.

7. A tractor as defined in claim 4, wherein said control valves for controlling said hydraulic cylinders and said control valve for controlling said different hydraulic device are secured to said lid plate by tightening bolts from above.

8. A tractor as defined in claim 6, further comprising a seat mounted on said lid of said floor sheet.

9. A tractor as defined in claim 6, wherein said maintenance opening is formed to envelope said area of installation in plan view.

10. A tractor as defined in claim 1, further comprising a bracket for pivotably supporting said lift arms, said bracket being secured along with said lid plate to a main body of said transmission case by common bolts.

11. A tractor as defined in claim 1, further comprising a bracket for pivotably supporting said lift arms, said bracket being formed integral with said lid plate.

12. A tractor as defined in claim 6, further comprising a seat pivotably mounted on said lid of said floor sheet.

13. A tractor as defined in claim 12, wherein said floor sheet includes a support wall extending upward from a rear position thereof.

14. A tractor as defined in claim 13, wherein said lid of said floor sheet has a fore and aft length approximately corresponding to a length of said support wall.

15. A tractor as defined in claim 13, wherein said lid, when opened, is supported through contact with said support wall.

16. A tractor as defined in claim 14, wherein, when said lid is opened, said seat has a bottom thereof supported through contact with said support wall.

* * * * *